Jan. 17, 1956 A. O. HOPPER 2,731,151
SYSTEM FOR HANDLING METAL CHIPS AND EXTRACTING OIL THEREFROM
Filed May 5, 1951 2 Sheets-Sheet 1
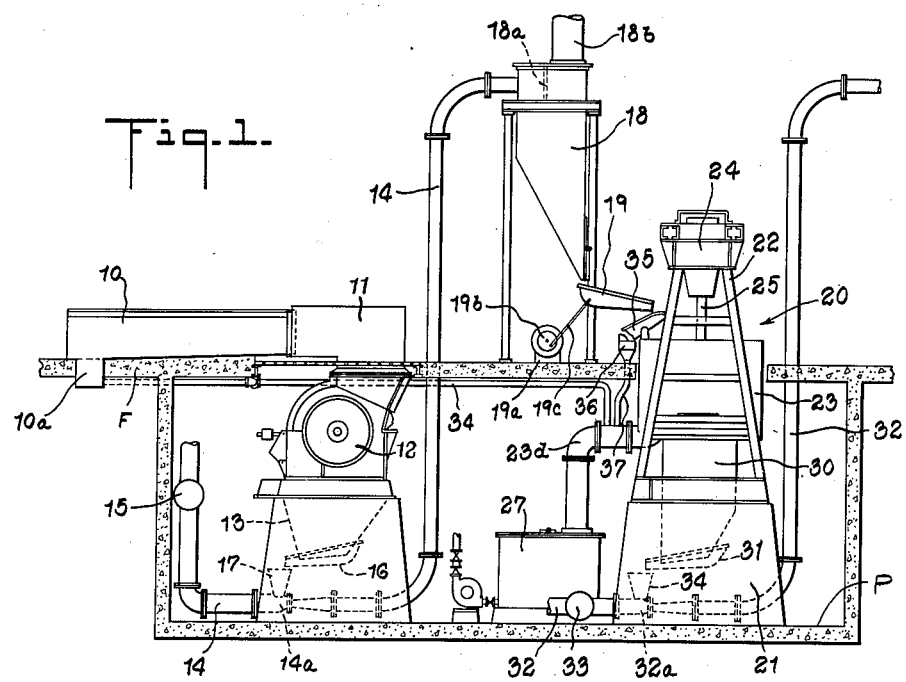
INVENTOR.
ALLEN O. HOPPER
BY
HIS ATTORNEYS

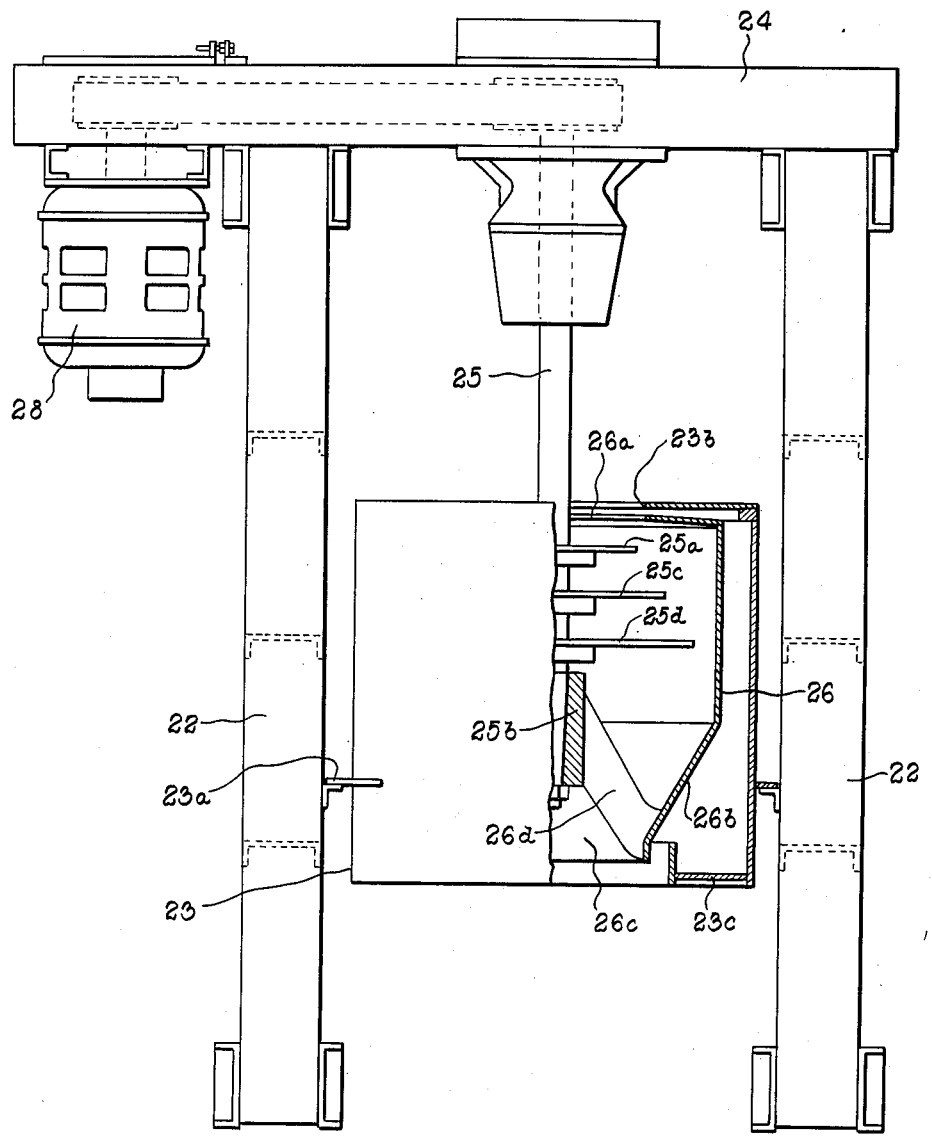

2,731,151

SYSTEM FOR HANDLING METAL CHIPS AND EXTRACTING OIL THEREFROM

Allen O. Hopper, South Orange, N. J., assignor to Turbine Equipment Company, New York, N. Y., a corporation of New Jersey Application May 5, 1951, Serial No. 224,736

7 Claims. (Cl. 210—68)

This invention relates to an improved system for continuously and automatically conveying crushed metal turnings or metal chips and, at the same time, removing oil or other cutting or cooling compounds from the turnings or chips. (For convenience, the term "chips" will hereinafter be used to designate both the turnings and the chips.)

Metal chips are generally produced on machines such as turret lathes, milling machines, drills, gear hobbers, boring mills, etc. Some are produced in a dry state, while others are produced with the use of soluble cutting compounds the reclamation of which is generally considerably worthless. However, in many cases cutting oils having a considerable reclamation value are used with these machines.

The types of waste metal produced from these machines may vary from fine and dry cast iron borings to curly oil-soaked steel turnings which are sometimes 6 to 8 ft. in length, or bushy, oil-soaked turnings which are removed from the producing machines in entangled bundles 2 or 3 ft. in diameter, the latter two types being very difficult and costly to handle in the form in which they are removed from the machines, and it is with these types that the present invention is particularly concerned.

No matter in what shape or form the scrap or chips are produced, there is always the problem of disposal of the waste material from the plant. This operation has generally been very costly to the manufacturer, since the method commonly used for the disposal requires repeated handling of the material. This is conducive to high labor costs, unsightly areas in which the material is handled, and very often the use of valuable manufacturing space for storage of scrap in its bulky form. The principal object of the present invention resides in the provision of an improved system for removing metal waste or chips from the manufacturing site as rapidly and economically as possible, with the use of a minimum of labor and floor area, and which during the course of such removal serves to extract from the chips, valuable cutting oils or other compounds for subsequent re-use.

A system made according to the invention comprises a pair of separate conveyor pipes of the pneumatic type, one a feed pipe and the other a discharge pipe. These pipes are connected to suitable blowers for forcing air through the pipes to convey the metal chips. Each pipe includes a nozzle through which the air flows at relatively high velocity to create a region of sub-atmospheric pressure in the pipe and thus facilitate admission of the chips. The latter are first collected in a feed hopper after they have been subjected to any necessary crushing to reduce them to small size, for example, an inch or so in length as a maximum. The feed hopper has a discharge passage leading to a funnel for conveying the chips from the hopper into the feed pipe at the region of its nozzle where the sub-atmospheric pressure prevails. The chips are conveyed by the air draft through the feed pipe to a surge bin which serves to feed them into a centrifugal extractor by means of a suitable feeding device. The feeding device may be operated in any suitable manner to start and stop the feed of chips to the extractor.

The centrifugal extractor comprises a hollow rotor provided with separate outlets for the chips and the extracted oil, or other liquid, respectively. The relatively dry chips discharged from the extractor are received in a surge hopper leading to a funnel for conveying the chips into the discharge pipe at the region of its nozzle where the sub-atmospheric pressure prevails. This discharge pipe serves to convey the chips to a suitable storage site or directly to a vehicle for removing them from the plant. The oil removed from the chips is discharged separately from the extractor into a collecting tank for subsequent processing and re-use.

In the preferred form of the system, the centrifugal extractor is of the intermittently operated type in which the rotor is in the form of a perforated basket open at both the top and the bottom. The finely divided chips from the surge bin are fed intermittently by the feeding device through the top opening in the basket while the latter is rotated at a relatively low speed. At this low speed, the chips are held by centrifugal force against the perforated wall of the basket. When the loading of the basket is completed, the operation of the feeding device is interrupted and the rotor is accelerated to its normal operating speed. During the rotation of the basket or rotor at its relatively high operating speed, the oil is removed from the chips by centrifugal force and passes through the perforated wall into a collecting channel surrounding the rotor and leading to the oil outlet of the extractor. After a suitable period of centrifuging at the relatively high speed, the driving of the rotor is interrupted and a braking action is applied to it. When the speed of the rotor becomes so low that the centrifugal force will not hold the chips against the wall, they fall automatically through the bottom opening into the surge hopper leading to the pneumatic discharge pipe. A new batch of chips is then delivered to the extractor by the feeding device and the cycle is repeated.

It will be apparent that the new system is adapted to handle the chips in a completely automatic manner from the time they are delivered to the feed hopper leading to the pneumatic feed pipe. The operations of starting the extractor rotor and the feeding device for supplying it, accelerating the rotor to its full operating speed after completion of the loading, and decelerating the rotor after the liquid extraction, to discharge the dry chips, may be effected automatically under control of a timing mechanism. The loading of the extractor may be accomplished while it is accelerating through a low speed range or while it is operating at a substantially constant low speed, but in either case the chips, during the loading period, are distributed evenly around the inside of the perforated wall so that the rotor is ready for the high spread extracting operation when the loading is completed.

For a better understanding of the invention reference may be had to the accompanying drawings, in which:

Fig. 1 is a schematic view of a preferred form of the new system;

Fig. 2 is a side elevational view, partly in section, of the centrifugal extractor, and Fig. 3 is a diagrammatic view of the control circuits for the system.

The system as illustrated comprises a pan 10 for receiving the uncrushed chips and having an oil drainage pocket 10a extending through the floor F on which the pan is mounted. The pan 10 serves as a storage area in which to accumulate a sufficient quantity of chips to warrant operation of the system. Also, it serves as a space where chips can be pulled apart to some extent and allow removal of any excess of foreign objects. It will be observed that the bottom of the pan slopes downward toward the drainage pocket 10a, so that oil drained from the chips, or any free oil from the "tote" pans, is collected in this pocket. From the pan 10, the chips are delivered to a crusher feed box 11, as by pushing the chips manually or by a power driven feeding device. The chips fall by gravity from the feed box 11 into a crusher 12, which may be of any conventional type, preferably the rotary type. Once in the crusher, the chips fall by gravity to the space between the usual grates and the crushing rings or hammers, where they are broken into small pieces or chips approximately an inch or less in size, enabling them to fall through the grate openings into an underlying surge hopper 13.

From the bottom of the surge hopper 13, the chips (together with the oil or other cutting liquid with which they are mixed) are delivered by gravity into a pneumatic feed pipe 14 through which an air draft is forced by means of a blower 15. Below the surge hopper 13, the feed pipe is provided with a nozzle 14a having a venturi throat. The air emerges from the nozzle 14a at high velocity so as to create a slight vacuum in the feed pipe at the region of the nozzle. The chips are delivered from the hopper 13 to the feed pipe by way of a vibrating feeder 16 underlying the hopper, the discharge end of the feeder 16 overlying the top of a funnel 17 leading downward into the sub-atmospheric pressure region of the feed pipe at the nozzle 14a. It will be apparent that with this arrangement, the problem of delivering the chips into the air stream in pneumatic feed pipe 14, where the pressure may normally be in the range of 3 to 5 lbs., for example, is eliminated. This relatively high pressure in the feed pipe would tend to cause "blowback" of the chips from the air stream to the atmosphere; but by creating a region of sub-atmospheric pressure in the pipe below the funnel 17, through use of the nozzle 14a, the chips will fall by gravity through the funnel and the suction in the feed pipe will expedite the feeding action. It will be understood that the nozzle 14a and funnel 17 constitute in effect an ejector similar to a water or steam jet eductor. The vibrating feeder 16 may be of any conventional type operated by a suitable motor (not shown.)

The chips are conveyed pneumatically through the pipe 14 to a surge bin 18 mounted on the floor F. The pipe 14 leads upward through the floor into the top portion of the bin 18. By reason of the finely divided form of the chips, the air draft in the feed pipe will convey the chips through the pipe at high velocity, that is, at a velocity in the order of 5000 ft. per minute. A baffle 18a extends downward from the top of the surge bin opposite the discharge end of the feed pipe, so that the chips are deflected downward into the tapered bottom portion of the bin. The air discharges from the bin through a top outlet 18b located at the side of the baffle 18a opposite the feed pipe. The surge bin 18 has a bottom outlet overlying a vibratory feeding device 19 for delivering the chips to a centrifugal extractor 20. The feeder 19 is adapted to be vibrated by a motor 19a operating through an eccentric 19b and a link 19c connected to the feeder. When the feeder 19 is stationary, the chips falling from the bottom of bin 18 will accumulate on the feeder to the level of the bottom opening in the bin and thus block this opening and prevent feeding of the chips. However, when the motor 19a is energized, the resulting vibration of the feeder will cause the chips to slide at a substantially uniform rate into the extractor 20 and unblock the bottom outlet of the surge bin.

The extractor 20 comprises a base 21 mounted in a pit P (in which the crusher 12 is also mounted) and supporting a frame 22 which, in turn, supports a rotor housing 23 by means of brackets 23a (Fig. 2). At the top of the frame is a head 24 in which a vertical drive shaft 25 is mounted for rotation. The shaft 25 extends downward into the housing 23, where it supports and drives a rotor or centrifugal basket 26 (Fig. 2). The housing and basket have aligned top openings 23b and 26a, respectively, surrounding the shaft 25 and through which the chips fall from the feeder 19. Below these openings, the shaft carries a horizontal disc 25a which serves to deflect the chips outward against the perforated cylindrical wall of the basket 26. Below the cylindrical wall, the basket has a frusto-conical portion 26b, likewise perforated, the lower or reduced end of which is open, as shown at 26c. This reduced end is surrounded by a trough 23c at the bottom of the stationary housing. From the bottom of the trough, a discharge pipe 23d (Fig. 1) forms a separate outlet for the oil or other liquid separated from the chips, the pipe 23d leading downward to a collecting tank 27. The basket 26 is connected to a hub 25b on shaft 25, by means of circumferentially spaced radial members 26d extending from the hub to the conical or bottom portion 26b of the basket. The basket is rotated within the housing 23 by an electric motor 28 driving the shaft 25 through a belt or other connection (not shown).

At the first part of each operating cycle, the basket 26 is driven by the motor at relatively low speed, as, for example, at the speeds incident to acceleration from zero to 450 R. P. M. During this period, the feeder 19 is operated to load the basket, the centrifugal force being sufficient to hold the chips against the basket wall above the conical portion 26b and cause a substantially even distribution of the chips around the inside of the basket. After a predetermined loading period, the feeder 19 is stopped and the basket is accelerated to its full operating speed, for example, 900 R. P. M., at which speed it is driven for a sufficient time to extract substantially all of the oil from the chips. This oil passes under centrifugal force through the perforations in the basket and against the stationary wall of the surrounding housing 23, where it collects in the trough 23c and discharges through pipe 23d. At the end of the extracting period, the driving of the basket is interrupted and a braking action applied (as described in more detail hereinafter). Thus, the chips fall automatically through the bottom opening 26c when the centrifugal force becomes insufficient to hold them against the basket wall.

The chip discharge from the centrifugal basket falls through the bottom of housing 23 into a surge hopper 30, from which it is delivered by a vibratory feeder 31 into a pneumatic discharge pipe 32. This pipe has an ejector nozzle 32a (similar to nozzle 14a) through which air is forced by means of a blower 33 in the pipe. A funnel 34 is positioned under the discharge end of feeder 31 and extends downward into pipe 32 at the sub-atmospheric pressure region created by nozzle 32a. Thus, the substantially dry chips are introduced into the discharge pipe 32 in the same manner as the chips, with the accompanying oil or other liquid, are introduced into feed pipe 14. In the pipe 32, the chips are delivered by the air draft to the desired destination (not shown), such as a storage space or a vehicle for removing them from the site.

As shown in Fig. 1, the drainage received in the pocket 10a, is delivered through a pipe 34 to the pipe 23d, where it joins the centrifugally extracted liquid passing to the tank 27. Also, any drainage from the chips in the surge bin 18 and the feeder 19 is allowed to drip over the lower or discharge end of this feeder into a trough 35, from which it flows by gravity through a funnel 36 and pipe 37 into the liquid discharge pipe 23d. It will be understood that the inertia or momentum of the chips discharging from the feeder 19, when it is vibrating, enables them to pass over the underlying end of trough 35 and into the extractor 20.

The pneumatic conveyor pipes 14 and 32 operate most efficiently when the chips are fed into them at a uniform rate of flow. Accordingly, the surge hoppers 13 and 30 are important to the proper operation of the system, particularly since some chips will usually pass through the crusher 12 more rapidly than others, and the discharge of chips from extractor 20 is intermittent. The vibratory feeders 16 and 31 provide a metered flow of chips from the surge hoppers to the respective conveyor pipes, so that the chips enter these pipes at a substantially uniform rate of flow. In this way, blocking of the conveyor pipes by a sudden excess of feed thereto is prevented.

Referring now to the control circuits illustrated in Fig. 3, the stator winding 28a of the extractor motor 28 is energized from a power line 40 through a normally open switch 41. This switch is adapted to be closed by energizing of a relay 42. A "reversing" switch 43 is connected in circuit with the stator winding and its energizing switch 41, the switch 43 being operated by a relay 44. When the relay 44 is deenergized, the switch 43 engages the lower contacts 43a so that current passes through the stator winding in one direction. However, when the relay 44 is energized, the switch 43 moves into engagement with the upper contacts 43b so as to reverse the direction of the current through the stator winding. In this way, a regenerative braking action is applied to the motor, thereby reducing the time required to decelerate the centrifugal basket 26 to the speed at which the chips will discharge through the bottom opening.

The rotor winding 28b of the extractor motor is energized from the power line 40 through a normally open switch 45, which is adapted to be closed by a relay 46. A resistor 47 is included in the rotor circuit but is adapted to be shunted by a normally open switch 48 which is closed upon energizing of a relay 49. Thus, when the relay 49 is deenergized, the motor 28 can operate only a relatively low speed due to the added resistance 47 in the rotor circuit, but when the relay 49 is energized to cut out the resistor 47, the motor can operate at its full speed.

A constant speed electric motor 50 is adapted to be energized by a current source 51 in a circuit 52. This motor drives a cam shaft 50a for controlling the extractor 20 and its feeder 19. Each complete revolution of the cam shaft 50a causes a complete cycle of the extractor. A cam 53 on this shaft controls a switch 51 for connecting the relays 42 and 46 in series across the current source 51, through the wiring 55. A second cam 56 controls a switch 57 for connecting the relay 49 across the current source 51, through wiring 58. A third cam 59 controls a switch 60 for connecting the relay 44 across the current source 51, through wiring 61. A cam 62 controls a switch 63 for connecting the feeder motor 19a to the power line 40, through wiring 64. At the start of the revolution of cam shaft 50a, the cam 53 closes switch 51 to operate relays 42 and 46 and thereby energize the motor windings 28a—28b. However, the cams 56 and 59 allow their respective switches 57 and 60 to remain open, whereby the resistor 47 causes the extractor motor to accelerate only to its relatively low speed, and the regenerative or braking switch 43 is held inoperative. At the same time (or shortly thereafter), the cam 62 closes switch 63 to energize the feeder motor 19a. This causes chips to be fed into the centrifugal basket 26 during the time in which it is accelerated to the relatively low speed permitted by the resistor 47, this period of time constituting a loading period. The loading period is terminated when the high portion 62a of cam 62 disengages the switch 63 and allows it to open, thereby stopping the feeder motor 19a. At the same time, the high portion 56a of cam 56 engages and closes the switch 57 to energize the relay 49, thereby closing switch 48 and cutting out the resistor 47. The extractor motor 28 then accelerates to its full operating speed, at which it is held during the centrifugal extracting period. The extracting period is terminated when the high portion 59a of cam 59 engages and closes the switch 60 to energize relay 44, thereby operating the regenerative switch 43 and imposing a braking action on the basket by reversing the direction of current through the stator winding 28a. This initiates a decelerating period, at the end of which the chips fall through the bottom opening of the basket into the surge hopper 30. The decelerating period and the complete cycle are terminated when the cams reach the starting positions illustrated in Fig. 3, wherein the cams 53, 56 and 59 permit their respective switches 51, 57 and 60 to open and deenergize the relays 46—42, 49 and 44, respectively.

The above-described cycle is initiated by closing a starting switch 66 to complete the circuit 52. When the starting switch is released, the circuit 52 remains energized by a holding circuit 67 including a switch 45a which is operated with the switch 45 under control of relay 46. At the end of the complete cycle, when the relay 46 is deenergized by opening of cam switch 51, the switch 45a opens the holding circuit 67 and deenergizes the cam motor 50. The next cycle is then initiated by reclosing the switch 66. In case it is desired to stop the operation of the extractor before completion of a cycle, a normally closed safety switch 68 may be opened to deenergize the circuit 52 and the relays 42—46.

In a typical operation of the system, the cams 56 and 62 provide a loading period of about eighty seconds, during which the extractor motor and basket accelerate to a relatively low speed of 450 R. P. M.; the cams 56 and 59 provide an extracting period of approximately 2 minutes, during which the motor and basket accelerate to a full speed of 900 R. P. M. and are held at that speed; and the cam 59 provides a braking or decelerating period of about forty seconds, making a total of about four minutes for the complete cycle. By using cams of different contours, the durations of the various operating periods may be changed as desired.

It will be apparent that the timing mechanism 50—53, 56, 59 and 62, and the associated switches, form a control means operatively connected to the feeding device 19 and rotor 26, for operating this feeding device only during rotation of the rotor at relatively low speed. They also form a means connected to the feeding device 19 and the speed-limiting device 47 of the extractor motor, for rendering these devices inoperative substantially simultaneously, so that the extractor feed is interrupted and the extractor rotor accelerates to its full operating speed. The "reversing" switch 43 constitutes a means for decelerating the extractor rotor 26 from its full operating speed, under control of the timing mechanism.

As shown in Fig. 2, the horizontal disc 25a overlies two discs 25c and 25d of larger size, so that the discs 25a, 25c and 25d are of progressively increasing diameter. In this way, the metal chips are distributed more evenly in the rotor in the axial or vertical direction, and a greater quantity of chips can be loaded into the rotor in each cycle.

I claim:

1. A system for treating metal chips mixed with a liquid to be extracted therefrom, which comprises a pair of separate conveyor pipes, one a feed pipe and the other a discharge pipe, blower means connected to the pipes for forcing air therethrough, a nozzle in each pipe through which the air flows at relatively high velocity to create a region of sub-atmospheric pressure in the pipe, a feed hopper for receiving the chips and having a discharge passage, a funnel for conveying chips from said passage into said region of the feed pipe, a surge bin to which the feed pipe leads for conveying chips pneumatically thereto, the bin having an air outlet, a centrifugal extractor having a hollow rotor provided with separate outlets for chips and extracted liquid, respectively, a device for feeding chips from the surge bin into the extractor rotor, control means connected to the rotor and the feeding device for rendering the feeding device inoperative in response to rotation of the rotor above a predetermined speed, a surge hopper underlying said chip outlet of the extractor rotor, means for decelerating the rotor below said predetermined speed to discharge the chips through the chip outlet and by gravity into the surge hopper, and a funnel for conveying chips from said last hopper into said sub-atmospheric pressure region of the discharge pipe.

2. A system according to claim 1, in which said chip outlet is in the bottom of the rotor, the system also comprising a motor for driving the rotor at a relatively high extracting speed, a device for limiting the motor to a relatively low speed for loading the rotor, said control means being connected to said feeding and limiting devices for rendering them inoperative substantially simultaneously, and means for decelerating the rotor from said extracting speed, whereby the chips are discharged by gravity through said bottom outlet of the rotor and into the surge hopper.

3. A system according to claim 1, comprising also a chip metering device interposed between each funnel and the hopper supplying it.

4. A system according to claim 1, comprising also a drainage interceptor underlying said feeding device and leading to the oil outlet of the extractor, whereby said drainage by-passes the extractor rotor to join the centrifugally extracted liquid.

5. A system for treating metal chips mixed with a liquid to be extracted therefrom, which comprises a pair of separate conveyor pipes, one a feed pipe and the other a discharge pipe, each pipe having an inlet opening, blower means connected to the pipes for forcing air therethrough, a feed hopper for receiving the chips and having a discharge passage, means for conveying chips from said passage into the said feed pipe by way of its inlet opening, a surge bin to which the said feed pipe leads for conveying chips pneumatically thereto, the bin having an air outlet, a centrifugal extractor having a hollow rotor provided with separate outlets for chips and extracted liquid, respectively, a device for feeding chips from the surge bin into the extractor rotor, control means connected to the rotor and the feeding device for rendering the feeding device inoperative in response to rotation of the rotor above a predetermined speed, a surge hopper underlying said chip outlet of the extractor rotor, means for decelerating the rotor below said predetermined speed to discharge the chips through the chip outlet and by gravity into the surge hopper, and means for conveying chips from said last hopper into said discharge pipe by way of its inlet opening.

6. A system for treating metal chips mixed with a liquid to be extracted therefrom, which comprises a centrifugal extractor having a hollow rotor provided at the top with an inlet opening and at the bottom with an outlet opening, the extractor including a motor for accelerating the rotor to an extracting speed and having a device operable to limit the motor to a maximum loading speed which is substantially less than said extracting speed, a device for feeding the chips into the extractor rotor through said top opening, a conveyor including a surge bin for supplying chips to the feeding device, means for decelerating the rotor below said loading speed to discharge the chips through said bottom outlet opening, timing mechanism operatively connected to the motor, the feeding device and said limiting device for operating the motor and said devices substantially simultaneously only during a predetermined loading period, the timing mechanism rendering said devices inoperative intermittently over a predetermined extracting and unloading period, control means operatively connected to the timing mechanism for operating the decelerating means over a portion of said last period, and a surge hopper for receiving chips discharged through said bottom opening.

7. A system according to claim 6, comprising also a plurality of axially spaced distributor discs mounted in the rotor for rotation about the rotor axis and located under said inlet opening, the discs being substantially flat and of progressively increasing diameter from the uppermost disc to the lowermost disc, whereby the feed during rotation of the rotor is distributed substantially uniformly against the inner wall of the rotor both circumferentially and axially thereof.

References Cited in the file of this patent

UNITED STATES PATENTS

| | | |
|---|---|---|
| 706,441 | McLaughlin | Aug. 5, 1902 |
| 827,502 | Campbell | July 31, 1906 |
| 1,127,284 | Robertson | Feb. 2, 1915 |
| 1,212,638 | Herr | Jan. 16, 1917 |
| 1,498,630 | Jensen | June 24, 1924 |
| 1,511,619 | Lechler | Oct. 14, 1924 |
| 1,597,438 | Ennis | Aug. 24, 1926 |
| 1,615,433 | Andrews | Jan. 25, 1927 |
| 1,820,374 | Carlson | Aug. 25, 1931 |
| 2,080,874 | Pecker | May 18, 1937 |
| 2,090,373 | Neuman | Aug. 17, 1937 |
| 2,105,059 | Steps | Jan. 11, 1938 |
| 2,328,394 | Neuman | Aug. 31, 1943 |
| 2,442,234 | Dunmire | May 25, 1948 |
| 2,549,033 | Tyrner | Apr. 17, 1951 |
| 2,551,838 | Huser et al. | May 8, 1951 |
| 2,556,058 | Boon | June 5, 1951 |
| 2,626,042 | Aldridge | Jan. 20, 1953 |